United States Patent
Gordon

[11] Patent Number: 5,651,632
[45] Date of Patent: Jul. 29, 1997

[54] RETAINER ASSEMBLY

[75] Inventor: Gary Gordon, Southfield, Mich.

[73] Assignee: TRW Inc., Cleveland, Ohio

[21] Appl. No.: 410,825

[22] Filed: Mar. 27, 1995

[51] Int. Cl.$^6$ ........................................ F16B 5/06
[52] U.S. Cl. .................. 403/319; 403/329; 403/407.1; 411/338; 24/662
[58] Field of Search .............. 403/405.1–408.1, 403/315–316, 397, 321, 325–327, 329, 319–320, 373–374, 192–193, 252–253, 368, 297; 411/338, 339, 354, 508, 48, 49; 24/297, 662, 324

[56] References Cited

U.S. PATENT DOCUMENTS

| | | | |
|---|---|---|---|
| 2,894,426 | 7/1959 | Rapata | 411/338 |
| 3,628,812 | 12/1971 | Larralde et al. | 403/329 X |
| 3,869,766 | 3/1975 | Raymond | 24/662 X |
| 3,890,680 | 6/1975 | Furuya | 411/338 X |
| 3,909,046 | 9/1975 | Legris | 403/374 X |
| 4,431,355 | 2/1984 | Junemann | 411/508 X |
| 4,688,961 | 8/1987 | Shioda et al. | 403/406.1 X |
| 4,762,437 | 8/1988 | Mitomi | 403/406.1 |
| 4,780,037 | 10/1988 | Payne | 411/433 |
| 4,810,147 | 3/1989 | Hirohata | 411/508 X |
| 4,878,792 | 11/1989 | Frano | 411/339 |
| 4,927,287 | 5/1990 | Ohkawa et al. | 403/408.1 |
| 4,952,106 | 8/1990 | Kubogochi et al. | 411/48 |
| 4,956,900 | 9/1990 | Mair | 24/606 |
| 5,085,545 | 2/1992 | Takahashi | 411/49 X |
| 5,106,223 | 4/1992 | Kraus | 403/11 |

FOREIGN PATENT DOCUMENTS 268500 10/1963 Australia ................. 24/662

Primary Examiner—Harry C. Kim
Attorney, Agent, or Firm—Fay, Sharpe, Beall, Fagan, Minnich & McKee

[57] ABSTRACT

A plastic retainer assembly for joining components to the end of a cylindrical post comprises a retainer having a body with a shell extending therefrom. The shell has an axially extending center opening adapted to be closely received on the post. Gripping teeth are carried by the shell and are mounted for radial movement between a radial inner position for gripping the post and a radial outer non-gripping position. A lock ring is engaged about the shell and is slidable axially thereof from a first to a second position. The lock ring includes camming surfaces for driving the gripping teeth to their radial inner position as the lock ring moves from its first to its second position. A latch subassembly is provided for preventing movement of the lock ring from the second to the first position.

3 Claims, 2 Drawing Sheets

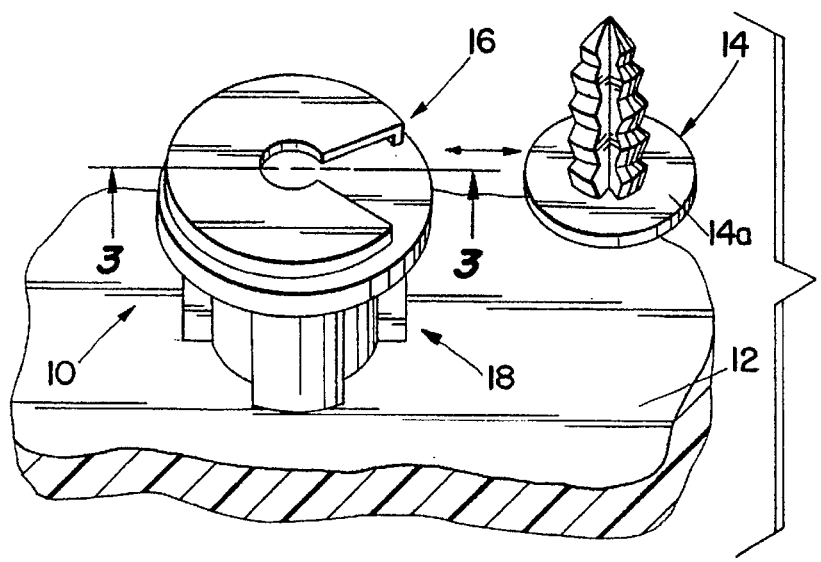
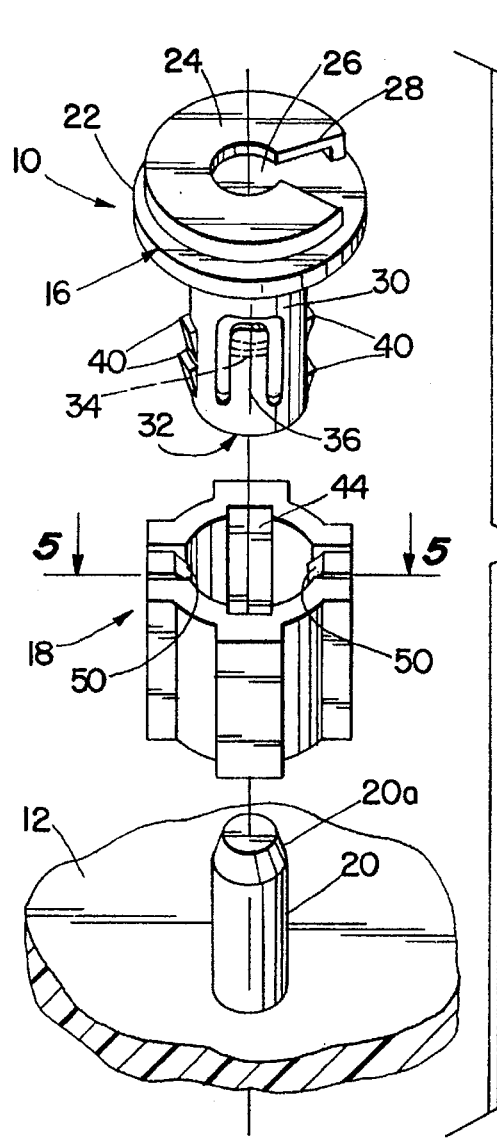
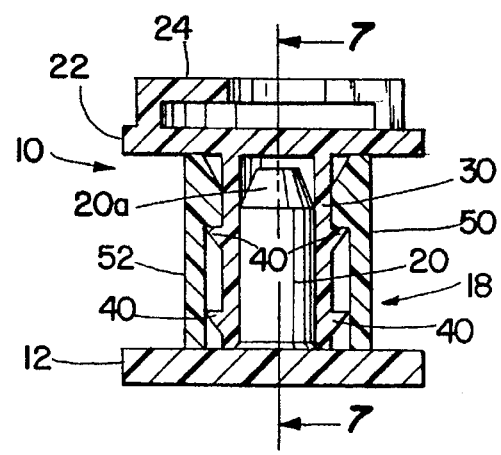
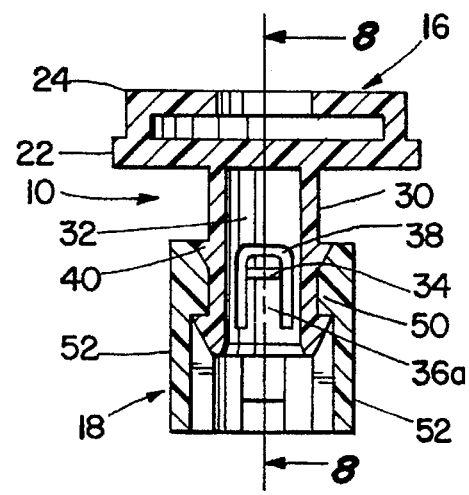

RETAINER ASSEMBLY

BACKGROUND OF THE INVENTION

The subject invention is directed to the fastener art and, more particularly, to a retainer for joining a component to the end of a post or rod.

The invention is especially suited for connecting ratchet fasteners to the ends of molded plastic posts as sometimes required in the vehicle art and will be described with reference thereto. However, the invention is capable of broader application could be used whenever it is desired to join a component to the end of a post or rod.

Vehicle door panels are molded with integral retainers on their back sides to releasably retain fasteners for joining the panels with associated door components. The integrally molded retainers operate in a satisfactory manner but require that the door panels be formed using relatively expensive dies having internal moving components, lifters, and the like.

SUMMARY OF THE INVENTION

The subject invention provides a retainer assembly that can be quickly connected to a post or rod. The door panels can thus be molded with simpler dies since only an outwardly extending post is required for acceptance of the retainer assembly.

In accordance with one aspect of the invention, there is provided a plastic retainer assembly for joining components to the end of a cylindrical post. The assembly generally includes a retainer body having a cylindrical shell-like extension. The extension includes an axially extending center opening adapted to be closely received on the post. Gripping teeth are carried by the extension and mounted for radial movement between a radial inner position for gripping the post and a radial outer non-gripping position. Engaged about the extension and slidable axially thereon from a first to a second position is a lock ring. The lock ring includes camming surfaces for driving the gripping teeth to their radial innermost position as the lock ring and the extension move relative to one another and, thus, move the lock ring from its first to its second position. Additionally, a latch subassembly is provided for preventing movement of the lock ring from the second to the first position.

In accordance with a more limited aspect, the gripping teeth are preferably carried at the ends of resilient legs extending axially of the extension.

In accordance with a more limited aspect, the latch subassembly preferably includes a portion operable to retain the lock ring on the shell-like extension while permitting movement of the lock ring only from the first position to the second position.

The assembly is such that it can be quickly slid into position on the post extending outwardly from a first component, e.g., door panel, intended to be joined to a second component. Thereafter, the movement of the lock ring from the first to the second positions causes the gripping teeth to be moved radially inward into engagement with the post. The body of the retainer assembly can itself be a fastener or means for carrying a fastener for engagement with the second component. Alternatively, the body itself can form part of the second component for connection to the first component carrying the post.

The above-described arrangement allows for simplified forming of the first component, such as a door panel. That is, molding can be done with a simple die that does not require internal moving parts, lifters, or similar complex mechanisms.

The retainer assembly can be a molded plastic component. In addition, the shell-like extension and the lock ring can be secured together in a pre-installation position so as to facilitate its use.

As can be seen from the foregoing, a primary object of the invention is the provision of a simplified retainer assembly that can be readily installed on a simple post or rod element to retain any of a variety of components thereto.

A further object of the invention is the provision of a retainer assembly wherein movement of the assembly into position on an associated post automatically causes connection of the assembly to the post.

A further object of the invention is the provision of a molded plastic retainer assembly that is simple to use and is readily adapted for a variety of different fastening or retaining functions.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is an isometric view showing the retainer assembly formed in accordance with a preferred embodiment of the invention joined to a first component and arranged for receipt of an associated fastener;

FIG. 2 is an exploded isometric view of the assembly illustrated in FIG. 1;

FIG. 3 is a vertical cross-sectional view taken generally along line 3—3 of FIG. 1;

FIG. 4 is a view similar to FIG. 3 but showing the retainer assembly components in their pre-installation position;

DETAILED DESCRIPTION OF THE PREFERRED EMBODIMENT

Figure 5:
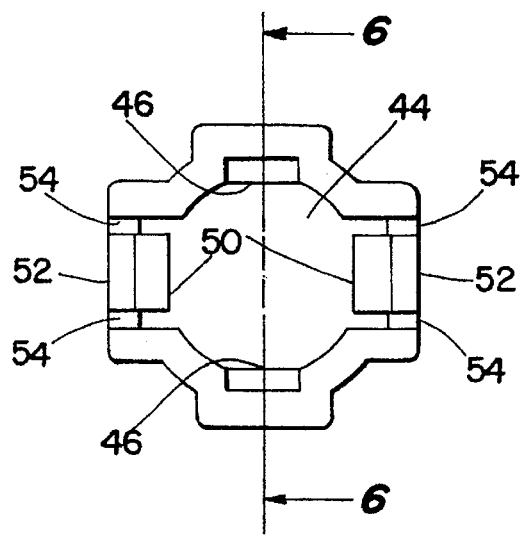
FIG. 5 is a top plan view of one of the components of the retainer assembly (the view is taken generally on line 5—5 of FIG. 2)

Referring now to the drawings wherein the showings are for the purposes of illustrating the preferred embodiment of the invention only and not for purposes of limiting same, FIGS. 1 and 2 best illustrate the overall arrangement of the preferred form of the retainer assembly 10 and illustrate the retainer assembly connected to a panel member, or first component, 12 for receiving and supporting an associated ratchet-type fastener 14. The fastener 14 joins an associated component (not shown) to the panel member 12. The retainer assembly 10 generally comprises a first element 16 and a second element, or lock ring, 18 that cooperate to semipermanently connect to a rod or post 20 which is joined to or formed integrally with the panel member 12.

The first element 16 of the retainer assembly 10 comprises a main body 22, shown as a circular disk-like head member, which allows the ratchet or pine tree type fastener 14 to be slid horizontally thereinto. Specifically, a fastener retaining portion 24 is provided and comprises a raised disk member having a center opening 26 and a lateral side opening 28 so that base 14a of the fastener 14 can be moved horizontally thereinto and resiliently retained to allow the fastener to be connected to an associated component.

Figure 7:
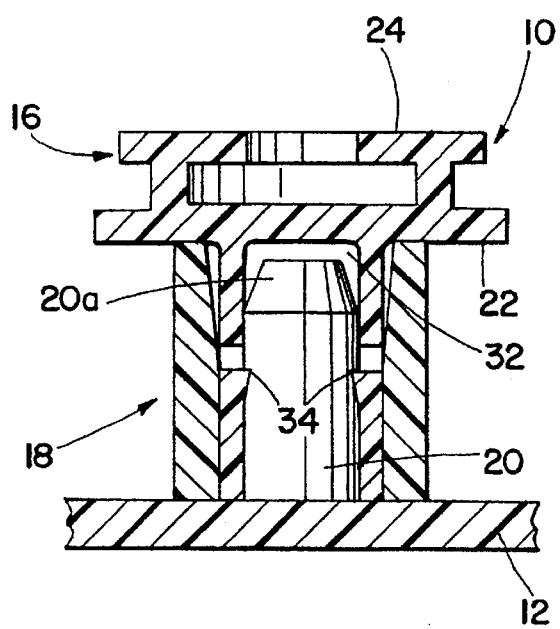
FIG. 7 is a cross-sectional view taken on line 7—7 of FIG. 3.
Figure 8:
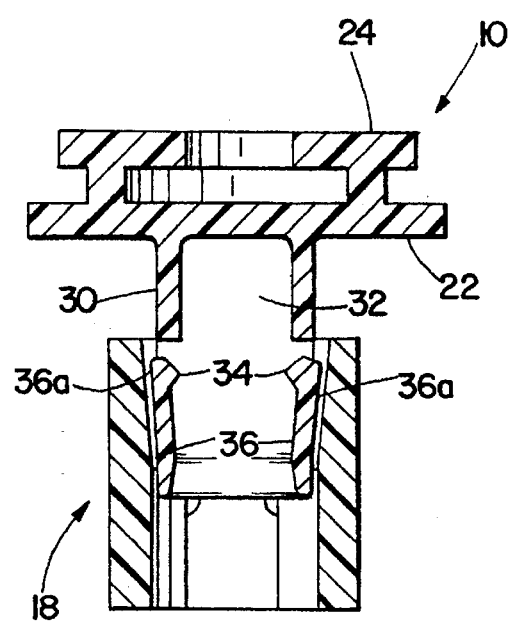
FIG. 8 is a cross-sectional view taken on line 8—8 of FIG. 4.

Extending axially from the body 22 is a hollow shell-like cylindrical extension, or shell, 30 that has a central cylindrical opening 32 extending axially therein. The opening 32 is sized and arranged so as to be capable of closely receiving the cylindrical post 20. Carried by the shell-like extension 30 are a plurality of radially inwardly extending gripping teeth 34 (see, for example, FIGS. 7 and 8). The gripping teeth 34 are supported on axially extending resilient legs 36. In the preferred embodiment, two legs 36 are located at diametrically opposite dies of the shell-like extension 30. The legs 36 are molded to have a normal position in which, as shown in FIG. 8, the teeth 34 are in a radially outer non-gripping position. Each of the resilient legs 36 are, in the preferred embodiment, arranged to extend in the axial direction along the sides of the extension 30. A generally U-shaped opening 38 is formed through the wall of the shell-like extension 30 and surrounds each of the legs 36.

The shell-like extension 30 also carries opposed pairs of latch elements 40 that have a somewhat triangular or wedge shape, as shown.

Figure 6:
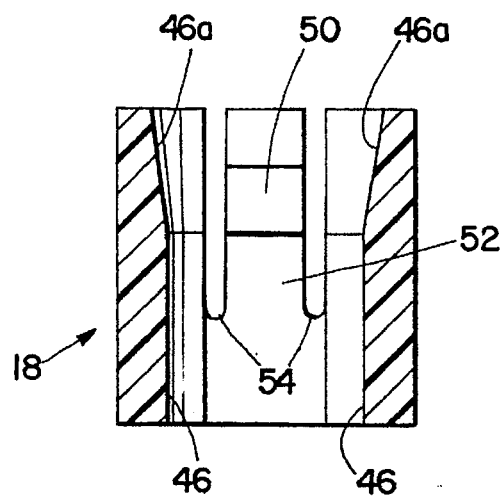
FIG. 6 is a cross-sectional view taken on line 6—6 of FIG. 5.

Associated with the element 16 and adapted to engage the shell-like extension 30 is the previously mentioned lock ring 18. As can be seen in FIGS. 1, 2, 5, and 6, the lock ring 18 is a somewhat cylindrical elongated body having a central opening 44 that is sized to closely receive the shell-like extension 30. At its diametrically opposite sides, there are provided axially extending recessed portions 46 which define vertically extending grooves that receive the resilient legs 36 of the shell-like extension 30 of the element 16. As seen in FIG. 6, upper ends, or surfaces, 46a of the recessed portions 46 are inclined or tapered and act as camming surfaces to engage surfaces 36a (see FIG. 8) of the legs 36. Thus, as the element 16 is moved axially into the lock ring 18, the resilient legs 36 are cammed inwardly to move the gripping teeth 34 radially inward to a point where they can grippingly engage with the post 20. The movement from the outer non-gripping position shown in FIG. 8 to a gripping position best shown in FIGS. 3 and 7 takes place merely by moving the elements 16 and 18 axially together while forcing them down onto the associated post element 20. It is noted that the outer free end of the post 20 is preferably tapered or provided with a circumferential chamfer such as shown at 20a. This facilitates location of the retainer assembly on the post and assists in installation of the post element into the center opening 32 of the element 16.

The subject embodiment also provides structure to retain the elements 16 and 18 in a pre-installed but assembled condition as shown in FIGS. 4 and 8. In this position, as previously mentioned, the gripping teeth 34 are in a radial outer or retracted position. To maintain the elements in this pre-installed but assembled position, the lock ring 18 is provided with resilient latch elements 50 adapted to engage between the latch elements 40 on shell 30. FIG. 6, together with FIGS. 3 and 4, illustrate the latch elements 50 which are located at diametrically opposite sides of the lock ring offset 90° from the recessed portions 46. Each of the latch elements 50 are carried at the upper end of a resilient arm member 52 formed in the sides of the lock ring by vertically extending grooves 54 formed through the wall thereof in the manner shown in FIG. 6. The general configuration of the latch elements 50 can be seen in FIGS. 3, 4, and 6. Note that in the pre-installed but assembled condition of FIG. 4, the latch elements 50 engage between the pairs of the latch elements 40 on the extension 30. This maintains the two elements 16 and 18 in an assembled, ready to install position. When an axial force is applied, however, to drive the two elements together during the installation, the resilient arm members 52 allow the latch elements 50 to be driven radially outward by the uppermost of the latch elements 40. The element 16 is moved within the lock ring 18 to the positions shown in FIGS. 3 and 7. As the elements move to the FIGS. 3 and 7 position, the camming action between the surfaces 36a and 46a drives the gripping teeth 34 radially inward into the post gripping and engaged position shown in FIG. 7. The retainer assembly is then firmly engaged and held to the post 20. Simultaneously with this final movement, the latch elements 50 return to an inward position with the underside of the latch elements 50 engaged above the uppermost latch elements 40 as illustrated in FIG. 3.

Thus, it is not possible to easily return the elements to the pre-installation but assembled position of FIG. 4 or to separate them entirely to the positions shown in FIG. 2. As a consequence, the latching assembly allows ready movement from the first assembled but pre-installed position to the second or installed position but does not permit a reverse movement from the second to the first position. If desired, a mechanism to release the latching subassembly could be provided.

Although the assembly could be formed from a variety of different materials, it is preferably molded from suitable plastic or similar resinous materials.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A plastic retainer assembly for joining components to the end of a cylindrical post, said assembly comprising:

a retainer having a body with a cylindrical shell extending therefrom and terminating in a free end, said shell having an axially extending center opening adapted to be closely received on the post;

a plurality of resilient legs each joined to said shell adjacent the free end and extending axially of said shell toward said retainer body and terminating in an end carrying at least one gripping tooth, each of said resilient legs mounted for radial movement between a radial inner position for causing said at least one gripping tooth to grip the post and a radial outer position wherein said at least one gripping tooth is in a non-gripping position;

a lock ring engaged about said shell and slidable axially thereof from a first position adjacent said free end to a second position adjacent said body, said lock ring including camming surfaces for driving the gripping teeth to their radial inner position as the lock ring moves from its first position to its second position; and, a latch subassembly for preventing movement of the lock ring from the second position to the first position.

2. A retainer assembly as defined in claim 1 wherein said latch subassembly includes cooperating latch members formed on the shell and the lock ring.

3. A retainer assembly as defined in claim 1 wherein the camming surface comprises a tapered surface on the lock ring extending axially thereof.

* * * * *